June 2, 1970     D. M. SWING ET AL     3,515,896

STANDBY SWITCHING SYSTEM

Filed March 13, 1969

INVENTORS
DENNIS M. SWING
LLOYD A. DRAKE

BY

ATTORNEY

INVENTORS
DENNIS M. SWING
LLOYD A. DRAKE

United States Patent Office 3,515,896
Patented June 2, 1970

3,515,896
STANDBY SWITCHING SYSTEM
Dennis M. Swing, Laguna Hills, Calif., and Lloyd A. Drake, Columbus, Ohio, assignors to Solidstate Controls, Inc., a corporation of Ohio
Filed Mar. 13, 1969, Ser. No. 806,984
Int. Cl. H02j 7/00, 1/04
U.S. Cl. 307—64    10 Claims

ABSTRACT OF THE DISCLOSURE

A means to switch from one power source to a second power source within one-half cycle after the failure of the first power source, thereby providing continuous power to a critical load. Specifically, the present invention utilizes silicon controlled rectifiers and a reed relay to provide the desired no-break transfer. Reference is made to the claims for a legal definition of the invention.

BACKGROUND

The technology of today has advanced to the point where there are many types of electrical loads which require a continuous source of power. As an example, there are electronic computers which will generate output errors if the computer's input fails for as much as one cycle or if a sudden phase or frequency shift should occur.

The present state-of-the-art in the means of switching between redundant power supplies can make the transfer in no less time than one-quarter cycle. Oftentimes these switching means are more complicated in circuitry than the inverter system which it is switching, thereby impairing the necessary reliability since all load power flows through the switching means.

Many times there will occur a short circuit or a substantial overload in a branch of the load. Unless there is provision for increasing the short circuit current capability of the system, substantial damage can occur in the load branch before its protective device operates.

Switching circuits of the prior art sensed only the output of the inverter and therefore had no indication that the inverter was failing until the supply had been completely lost.

Sensing of the output of the inverter is, however, important so that a failure or deterioration of the sinusoidal output voltage of the inverter or a gradual overload will be noted.

In all switching applications to maintain continuous power it is an essential requisite that the primary and secondary sources be in phase and frequency synchronization.

SUMMARY OF THE INVENTION

The present invention relates to a means for switching from the first source of power to a secondary source of power upon the occurrence of any of three modes of abnormal operation. The first mode is the failure or deterioration of the square wave output of the static inverter (primary source) before it enters the inverter's filter section. Secondly, the failure or deterioration of the sinusoidal output voltage of the inverter's filter. The third mode is a branch load fault or an overload which exceeds the current capacity of the primary source.

By a combination of silicon controlled rectifiers (SCR's) and a reed relay the switching system of the invention can make the necessary transfer upon failure or deterioration of the square wave input to the inverter's filter. Parallel pairs of SCR's are controlled by the reed relay so that only one pair is conducting under any given steady state condition. One pair of SCR's controls the primary source and the second pair controls the secondary source. Due to the inherent characteristic of an SCR to continue conducting until the current through it drops below the "holding" value, there will be a period of time (up to one-half cycle) where all four SCR's are conducting simultaneously. It is during this time that synchronization between the sources must be maintained. There is, therefore, a make-before-break transfer from one power source to the other.

OBJECTS

It is therefore a principal object of the invention to provide an improved standby switching system.

Another object of the invention is to provide a standby switching system which monitors the square wave input to an inverter's filter for failure and deterioration.

Another object of the invention is to provide a standby switching system which is simple in construction relative to the power sources it controls.

Another object of the invention is to provide a standby switching system which permits fail safe logic operation.

Another object of the invention is to provide a standby switching system which monitors the output of an inverter's filter for failure and deterioration.

A further object of the invention is to provide a standby switching system which has a switching time of one-half cycle or less.

Still a further object of the invention is to provide a standby switching system which permits high in-rush starting currents to be supplied by a secondary source so as to decrease the required steady state primary source current capacity.

For a complete understanding of the invention, together with other objects and advantages thereof, reference may be made to the accompanying drawings, in which:

DESCRIPTION OF THE PREFERRED EMBODIMENT

Figure 1:
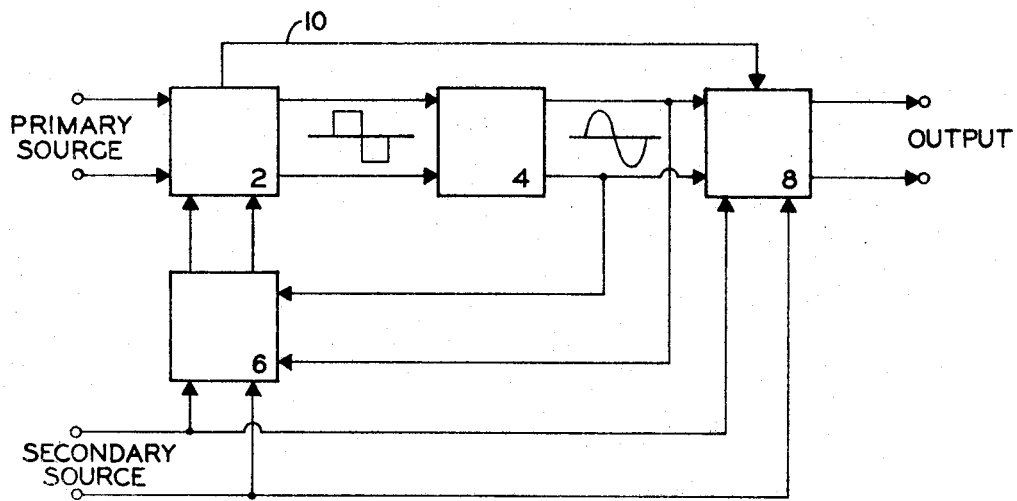
FIG. 1 is a block diagram representation of a typical system for maintaining a continuous input to a critical load.

Referring to FIG. 1, there is illustrated in basic block form a typical system for maintaining continuous input to a critical load. For discussion purposes it will be assumed that the primary source includes a static inverter system and that the secondary source is a conventional commercial A.C. power supply. In actual practice the only requirement for the two sources is that they be of comparable capacity.

With the primary source a D.C. supply in FIG. 1, the inverter switching section 2 converts the D.C. to a rectangular time varying source. This rectangular waveform source is changed to a sinusoidal waveform source by the inverter filter 4. The function of the synchronization circuit 6 is to compare the output sine wave from the inverter filter 4 to that of the secondary A.C. source. Difference in phase and frequency is detected and a correcting signal sent to the oscillator in the inverter switching circuit 2. The secondary A.C. source provides power on failure of the inverter system. Instantaneous transfer between the static inverter output and the secondary A.C. source is provided by the static switch 8 of the present invention. Transfer is initiated by a transfer signal 10 provided by the inverter switching section 2.

Substantially all forms of inverter 2 component failures result in the deterioration or complete collapse of the inverter's output square wave. A ferroresonant filter 4 inherently possesses an electrical "momentum" which will cause its output to be sustained for a few milliseconds following a failure in the filter's input. Therefore, monitoring the input square wave will give a few milliseconds advance notice of a total source failure. It is the utilization of this advance notice to actuate the static switch which is the basis of the invention.

Figure 3:
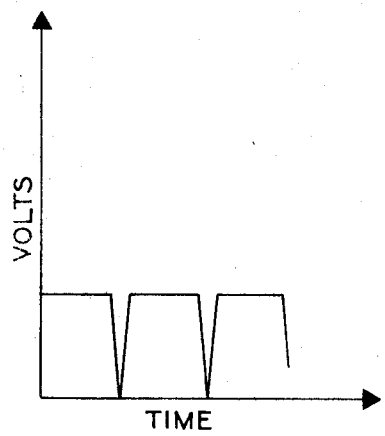
FIG. 3 is a graphical illustration of the rectified square wave shown in FIG. 4.
Figure 4:
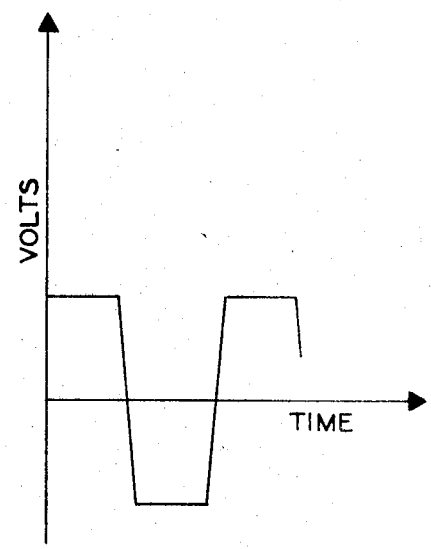
FIG. 4 is a graphical representation of a practical square wave having finite rise times.
Figure 2:
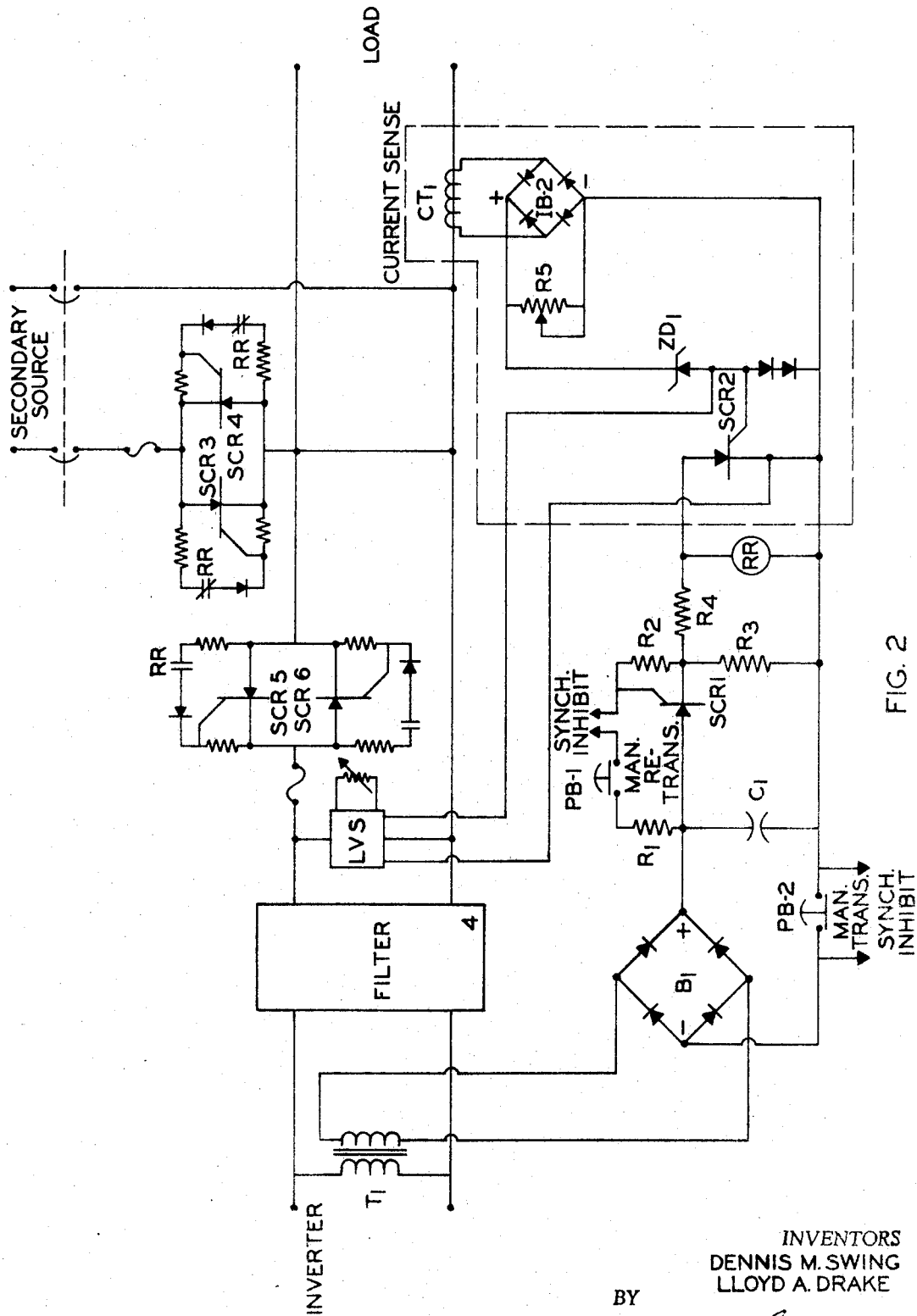
FIG. 2 is a schematic representation of the preferred embodiment of the invention.

A schematic representation of the circuit of the preferred embodiment is illustrated in FIG. 2. The switching of the square wave output of the inverter switching circuit 2 is accomplished by stepping down the square wave from 130 volts peak to about 18 volts peak with transformer $T_1$. This voltage is then rectified by bridge rectifier $B_1$ with a resultant D.C. as shown in FIG. 3. As seen in FIG. 3 there are valleys which fall to the axis. These valleys are the result of finite rise times of the original square wave shown in FIG. 4 (with a perfect square wave there would be no valleys). A satisfactory rectified square wave would never spend more than a few microseconds at any voltage other than peak value. Therefore, if the valleys ever increase in width or the D.C. falls to zero, a transfer should occur.

The state of the reed relay (RR) determines which set of parallel power SCR's are conducting. When RR is energized, SCR's 5 and 6 supply the load current. When RR is de-energized, SCR's 3 and 4 supply the load current.

The state of RR is determined by the conduction station of SCR 1. In normal operation, SCR 1 is conducting, having been initially gated on by the operator depressing the retransfer pushbutton (PB-1) at start-up. Once conducting, SCR 1 remains on until the current through it drops below the "holding" value. The "holding" current of an SCR is on the order of one-thousandth of the full load rating.

Since, as shown in FIG. 3, a practical rectified square wave will have valleys going to the axis, the "holding" current of SCR 1 would not be maintained causing it to go into a nonconductive state. For this reason capacitor $C_1$ is in the circuit to support the voltage during the lower portion of the valley so that the "holding" current is exceeded and SCR 1 remains conducting.

The filtering provided by $C_1$, however, is not capable of supporting the "holding" current for longer than a few microseconds. Therefore, when a failure occurs or the square wave rise time increases (a symptom of impending failure), SCR 1 ceases to conduct and the reed relay deenergizes.

The reed relay operates in 50 microseconds to close the gates of the secondary source's SCR's 3 and 4 and at the same time opens the gates of the inverter filter's SCR's 5 and 6. Due to the nature of SCR's to remain conducting until the current through anode-cathode goes to approximately zero, there is a no-break transfer with as much as 8⅓ milliseconds (half cycle at 60 Hz.) of overlap where the filter 4 and the secondary source supply the load power. Due to the "momentum" of the filter 4, the output of the filter does not have time to deteriorate prior to the secondary's SCR's being gated on.

The current limiting characteristics of the filter and the filter-secondary source phase coincidence reduces circulating currents during the period of parallel operation. The retransfer is initiated by pressing PB-1 and reversing the previous events.

A phase-lock synchronizing circuit is necessary to synchronize the inverter output to the secondary source when the invention is employed. This minimizes the load voltage disturbance during the transfer and retransfer operations. For manual transfer and retransfer operations, the static switch should be inhibited by the synchronizing circuit until in-phase synchronization is achieved. In the automatic mode of transfer (failure transfer), no inhibits are allowed because a lace of transfer may be more harmful than an out-of-synchronization transfer.

The circuit shown in FIG. 2, also makes provision for sensing the sinusoidal output voltage of the filter to detect deterioration or failure. Sensing at this point is not necessarily to spot a failed filter (they are extremely long-life devices), but rather to sense a slow (several cycles) amplitude change in the output sine wave due to a gradual overload or an inverter frequency deviation which causes the filter output to deviate high or low from the nominal output level. The sensing means consists of a transistorized differential amplifier (shown as block LVS in FIG. 2) which compares the output voltage to an internal reference. An adjustment potentiometer sets the transfer limits. The circuit looks at several cycles before causing a transfer. The LVS circuit fires SCR-2 which fires and thus causes the reed relay (RR) to change states and initiate a transfer.

One additional mode of abnormal operation will cause a transfer to occur. This mode consists of a branch load fault or an overload which exceeds the current capacity of the inverter and filter. This mode is useful for clearing branch protective devices in the shortest possible time (the actual clearing time is more dependent on the secondary source and the protective device characteristics than on the static switch). The mode is also useful for preventing an inverter overload, which collapses output voltage, when the load for any reason accumulates beyond the inverter rating.

The load current sensing means is indicated in the dotted portion of the circuit shown in FIG. 2. A current transformer (CT-1) senses output load current and causes the voltage across resistor, $R_5$, to vary as the output current varies. Resistor, $R_5$, is set to develop a voltage which fires SCR 2 when the load current exceeds the peak value of normal load current. The silicon controlled rectifier, SCR 2, causes the reed relay, RR, to de-energize and transfer to the secondary source occurs. When the load is decreased to normal limits, a manual retransfer can be initiated by pressing pushbutton, PB-1.

Any of the above operations described as "manual" can be automatic if desired simply by using an adjustable timer. The "retransfer" operations, for instance, are the most likely to automate.

Use of the static switch provides the capability of starting loads having an in-rush current substantially larger than the current limit point of the inverter-filter combination. Once started the inverter can perform a no-break take-over of the load by initiating the manual retransfer.

The switching means disclosed herein can be adapted for use in switching power supplies which are three phase. For three-phase applications, the modifications which would be necessary could easily be made by one versed in the art utilizing the teachings of the present invention.

Although a certain and specific embodiment has been illustrated, it is to be understood that modifications may be made without departing from the true spirit and scope of the invention.

What is claimed is:

1. A standby power switching system comprising a D.C. source of power, means for converting said D.C. source to a periodic time varying waveform, means for filtering said periodic waveform to obtain a sinusoidal waveform, means to compare said sinusoidal waveform with a secondary source for phase and frequency coincidence, means to phase and frequency synchronize said sinusoidal waveform and said secondary source, means to monitor said periodic time varying waveform, and means to switch from said sinusoidal waveform to said secondary source upon deterioration of said periodic time varying waveform.

2. A system as set forth in claim 1 wherein said means for filtering said periodic waveform is a ferroresonant filter.

3. A system as set forth in claim 1 wherein said monitoring means further comprises means to rectify said periodic waveform, and means to maintain said rectified periodic waveform at a positive potential during normal operation of said converting means, said positive potential being at least equal to the current required to maintain a silicon controlled rectifier in a conduction state.

4. A system as set forth in claim 1 wherein said switching means further comprises a silicon controlled rectifier and a relay including a coil, said monitoring means connected to said rectifier, said rectifier's state of conduction determined by said monitoring means, said rectifier connected to said relay coil, said rectifier controlling the current through said coil, said relay having a set of normally open contacts and a set of normally closed contacts, said normally open contacts connected to a first pair of parallel silicon controlled rectifiers, said normally closed contacts connected to a second pair of parallel silicon controlled rectifiers, said first and second pairs of silicon controlled rectifiers connected to a load, said first pair of silicon controlled rectifiers when in a conduction state permitting said sinusoidal waveform to supply said load, and said second pair of silicon controlled rectifiers when in a conduction state permitting said secondary source to supply said load.

5. A system as set forth in claim 4 wherein said relay is a reed relay.

6. A system as set forth in claim 4 wherein upon the switching of said relay said first pair of parallel silicon controlled rectifiers and said second pair of parallel silicon controlled rectifiers are all in a conduction state at once for the period of time required for said sinusoidal waveform to cross the zero axis.

7. A system as set forth in claim 6 wherein said period of time is equal to one-half cycle or less.

8. A system as set forth in claim 1 wherein said switching system further comprises means for monitoring said sinusoidal waveform, said monitoring means consisting of a transistorized differential amplifier.

9. A system as set forth in claim 1 wherein said switching system further comprises means for monitoring the load current, said monitoring means connected to said switching means, said monitoring means consisting of a current transformer, a resistor, and a silicon controlled rectifier, said transformer connected to said resistor, said transformer causing the voltage across said resistor to vary in relation to variations in said load current, said resistor connected to said silicon controlled rectifier, said voltage causing said silicon controlled rectifier to pass into a conduction state causing said switching means to transfer from said sinusoidal waveform to said secondary source.

10. A system as set forth in claim 1 wherein said system is utilized to switch three-phase power.

References Cited

UNITED STATES PATENTS

| 3,201,592 | 8/1965 | Reinert et al. | 307—64 |
| 3,229,111 | 1/1966 | Schumacher et al. | 307—64 |
| 3,300,651 | 1/1967 | Larsen | 307—64 X |
| 3,337,743 | 8/1967 | Rolfes | 307—64 X |
| 3,339,082 | 8/1967 | Rhyne | 307—64 X |

ROBERT K. SCHAEFER, Primary Examiner

H. J. HOHAUSER, Assistant Examiner

U.S. Cl. X.R.

307—60